(12) United States Patent
Ohashi et al.

(10) Patent No.: US 8,815,425 B2
(45) Date of Patent: Aug. 26, 2014

(54) PROTECTION COVER ATTACHMENT STRUCTURE OF BATTERY-MOUNTED FUSIBLE LINK UNIT

(75) Inventors: Norihiro Ohashi, Shizuoka-ken (JP); Hideaki Tsukiji, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 717 days.

(21) Appl. No.: 12/199,494

(22) Filed: Aug. 27, 2008

(65) Prior Publication Data
US 2009/0061291 A1 Mar. 5, 2009

(30) Foreign Application Priority Data
Sep. 3, 2007 (JP) ................. P2007-227438

(51) Int. Cl.
 *H01M 2/34* (2006.01)
 *B60R 16/04* (2006.01)
 *H01R 11/28* (2006.01)
 *H01M 2/04* (2006.01)
 *H01R 13/447* (2006.01)

(52) U.S. Cl.
 CPC ............ *B60R 16/04* (2013.01); *H01R 11/287* (2013.01); *H01M 2/34* (2013.01); *H01M 2/043* (2013.01); *H01R 13/447* (2013.01); *Y02E 60/12* (2013.01)
 USPC .......................................................... 429/65

(58) Field of Classification Search
 USPC ............. 429/65, 96, 100, 151, 153, 163, 175; 361/837
 See application file for complete search history.

(56) References Cited

U.S. PATENT DOCUMENTS

| 5,643,693 | A | 7/1997 | Hill et al. |
| 5,645,448 | A | 7/1997 | Hill |
| 6,520,804 | B2 | 2/2003 | Sumida et al. |
| 7,046,115 | B2 | 5/2006 | Higuchi et al. |

(Continued)

FOREIGN PATENT DOCUMENTS

| JP | 02-74762 | 6/1990 |
| JP | 2004-23048 | 2/1992 |

(Continued)

OTHER PUBLICATIONS

Notice of Reasons for Refusal issued by the Japanese Patent Office on Apr. 27, 2012 and mailed May 8, 2012 for Japanese Patent Application No. 2007-227438, 3 pgs.

(Continued)

*Primary Examiner* — Ula C Ruddock
*Assistant Examiner* — Scott J Chmielecki
(74) *Attorney, Agent, or Firm* — Finnegan, Henderson, Farabow, Garrett & Dunner, L.L.P.

(57) ABSTRACT

A protection cover attachment structure of a battery-mounted fusible link unit includes a fusible link unit including a resin housing with a slide guide groove and a protection cover including an upper surface cover and side surface covers. The upper surface cover covers the upper surface of the resin housing and a battery post and a battery terminal. The side surface covers extend downward from a peripheral edge of the upper surface cover and cover the wire-attached terminals connected to the terminal sections of the fusible link unit and upper part of wires which are connected to the terminals and extended downward. When the protection cover is put over the resin housing, the slide guide grooves restricts the position of the protection cover and guides a side edge of at least one of the side surface covers downward.

6 Claims, 5 Drawing Sheets

(56) References Cited

U.S. PATENT DOCUMENTS

| | | |
|---|---|---|
| 7,176,780 B2 | 2/2007 | Iwata |
| 2001/0002812 A1* | 6/2001 | Sumida et al. ............... 337/227 |
| 2002/0168566 A1* | 11/2002 | Ohtsuka et al. ............... 429/175 |
| 2004/0137315 A1* | 7/2004 | Matsunaga et al. ............ 429/65 |

FOREIGN PATENT DOCUMENTS

| | | |
|---|---|---|
| JP | 9-213198 | 8/1997 |
| JP | 10-338085 | 12/1998 |
| JP | 11-007881 | 1/1999 |
| JP | 2011-007881 | 1/1999 |
| JP | 2000-195408 | 7/2000 |
| JP | 2001-156469 | 8/2001 |
| JP | 2002-358867 | 12/2002 |
| JP | 2004-47178 | 2/2004 |
| JP | 2004-127704 | 4/2004 |
| JP | 2006-320146 | 11/2006 |

OTHER PUBLICATIONS

Notice of Decision of Rejection in Japanese Patent Application No. 2007-227438 issued on Oct. 9, 2012 from the Japanese Patent Office and mailed on Oct. 16, 2012.

Notice of Reasons for Refusal issued by the Japanese Patent Office on Dec. 24, 2013 and mailed Jan. 7, 2014 for Japanese Patent Application No. 2012-280806, 3 pages.

* cited by examiner

PROTECTION COVER ATTACHMENT STRUCTURE OF BATTERY-MOUNTED FUSIBLE LINK UNIT

CROSS REFERENCE TO RELATED APPLICATION

This application is based upon and claims the benefit of priority from Japanese Patent Application No. 2007-227438 filed on Sep. 3, 2007, the entire contents of which are incorporated herein by reference.

BACKGROUND OF THE INVENTION

1. Field of the Invention

The present invention relates to an attachment structure of a protection cover of a fusible link unit (a battery fuse) directly mounted on a battery post.

2. Description of the Related Art

In the case where a fusible link unit for distributing power to loads is directly mounted on a battery of an automobile, at least a part of the fusible link unit directly connected to the battery post through a battery terminal is covered with a resin-made protection cover separately attached.

Japanese Patent Laid-open Publication No. 10-338085 discloses a technique to attach a protection cover serving in such a manner as described above. In this technique, the protection cover is attached to a box body accommodating a fusible link through a hinge. When needed to cover a part being protected, the protection cover is rotated and covers the part.

Another protection cover as shown in FIG. 1 is known. A protection cover 130 covering an upper surface of a fusible link unit 110 is attached and fixed to the fusible link unit 110 using a crow-type lock unit 132 (see Japanese Patent Laid-open Publication No. 2002-358867).

SUMMARY OF THE INVENTION

In the case of attaching the protection cover to the fusible link unit using a hinge like the technique described in Japanese Patent Laid-open Publication No. 10-338085, a part of a constituent component of the hinge needs to be provided for a housing of the fusible link unit, and the structure thereof is complicated. Moreover, the fusible link unit and protection cover need to be linked by the hinge in advance, and the assembly thereof is troublesome. Generally, the resin material constituting the housing of the fusible link unit is often added with talc or glass filler in view of heat resistance when a fusing element is fused. In this case, the housing tends not to be resistant to deflection, and if a part subjected to local deflection, such as a constituent component of the hinge, is integrally formed with the housing of the fusible link unit, the housing could have locally insufficient strength. Accordingly, it is necessary to mold with expensive resin having high strength and good heat resistance instead of normal cheap resin, thus often increasing the cost.

Moreover, as shown in FIG. 1, the protection cover 130 cannot be accurately attached to the fusible link unit 110 unless the position where a lock unit 132 is fit is well seen and checked.

In the light of the aforementioned circumstances, an object of the present invention is to provide a protection cover attachment structure of a battery-mounted fusible link unit which has a simple structure, allows an improvement in operation of attaching the protection cover, and allows normal production of resin-made housing of the fusible link unit.

An aspect of the present invention is a protection cover attachment structure of a battery-mounted fusible link unit, the structure comprising: a resin housing having: a terminal section in an upper surface thereof, the terminal section being connected to a wire-attached terminal with a wire extending downward and/or a battery post through a battery terminal; and a slide guide groove provided on a side surface thereof, extending downward from the upper surface thereof; and a protection cover having: an upper surface cover covering the upper surface of the resin housing and the battery post and battery terminal; and a side surface cover extending downward from a peripheral edge of the upper surface cover and covering the wire-attached terminals connected to the terminal section and upper part of the wires which are connected to the wire-attached terminals and extended downward. In this structure, when the protection cover is put over the resin housing directly mounted on a battery, the slide guide groove restricts a transverse movement of the side surface cover and guides a side edge thereof downward.

In the protection cover attachment structure of the present invention, the slide guide groove may include a guide section in an upper end thereof. The guide section preferably facilitates insertion of a lower end of the side edge of the at least of the side surface covers into the slide guide groove. Moreover, the guide section is preferably wider than the other portion of the slide guide.

In the protection cover attachment structure of the present invention, the resin housing may further include: at least two walls provided on the side surface of the resin housing, the walls defining a wire accommodation groove which extends downward from the terminal section and accommodates the wires extending downward from the wire-attached terminals; and a slope portion provided in each of upper portions of the walls. In this structure, an upper edge of the guide section is positioned in/above an extension of the slope of the slope portion.

In the protection cover attachment structure of the present invention, at least one of the walls may include a wire restriction portion preventing a wire accommodated in the wire accommodation groove from being detached. Preferably, the wire restriction portion includes a protrusion formed by bending an end of the one of the walls into an L-shape.

According to the present invention, when the protection cover is simply put over the resin housing, the both side edges of the side surface cover of the protection cover are inserted into the slide guide grooves to be guided. Therefore, the protection cover can be reliably positioned and easily attached to a predetermined position, thus improving the workability in attaching the protection cover. The upper surface cover covers the first and/or second terminal sections in the upper surface of the fusible link unit and the entire part connected to the battery post. The side surface covers cover the wire-attached terminals exposed in the side surface of the resin housing and the upper parts of the wires. Accordingly, the terminals and the exposed parts of the conductors of the wires can be entirely covered with the protection cover in a safe way. Moreover, the side surface covers are integrally provided with the protection cover. Accordingly, by just putting the protection cover over the fusible link unit, the necessary part of the side surface of the fusible link unit can be covered. Accordingly, in the case where space in the side of the battery is so narrow that the operator's hand cannot reach the side of the battery where the wires are attached, the side covers can be attached and detached.

DESCRIPTION OF THE EMBODIMENT

Figure 1:
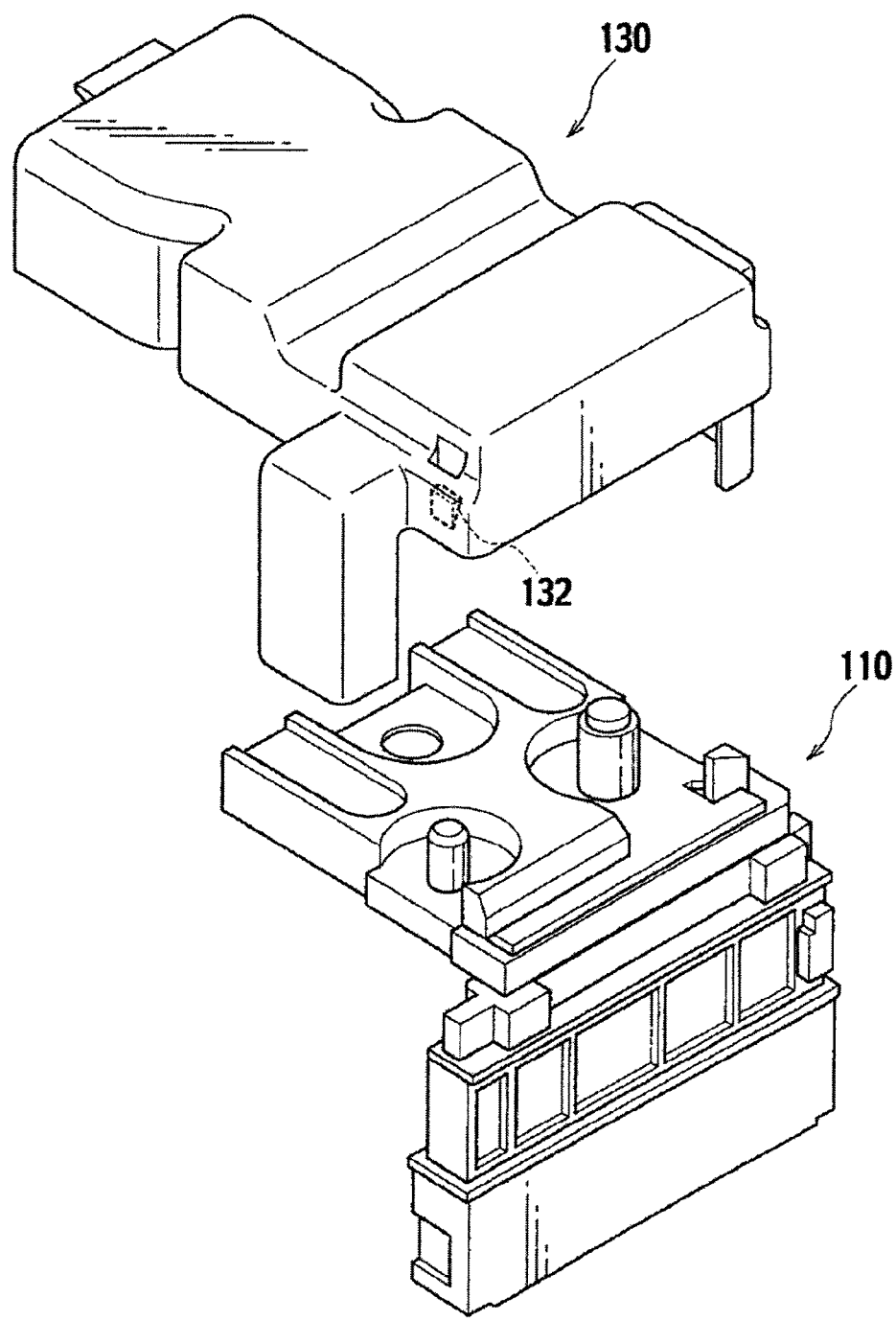
FIG. 1 is a perspective view showing a conventional protection cover attachment structure.
Figure 2:
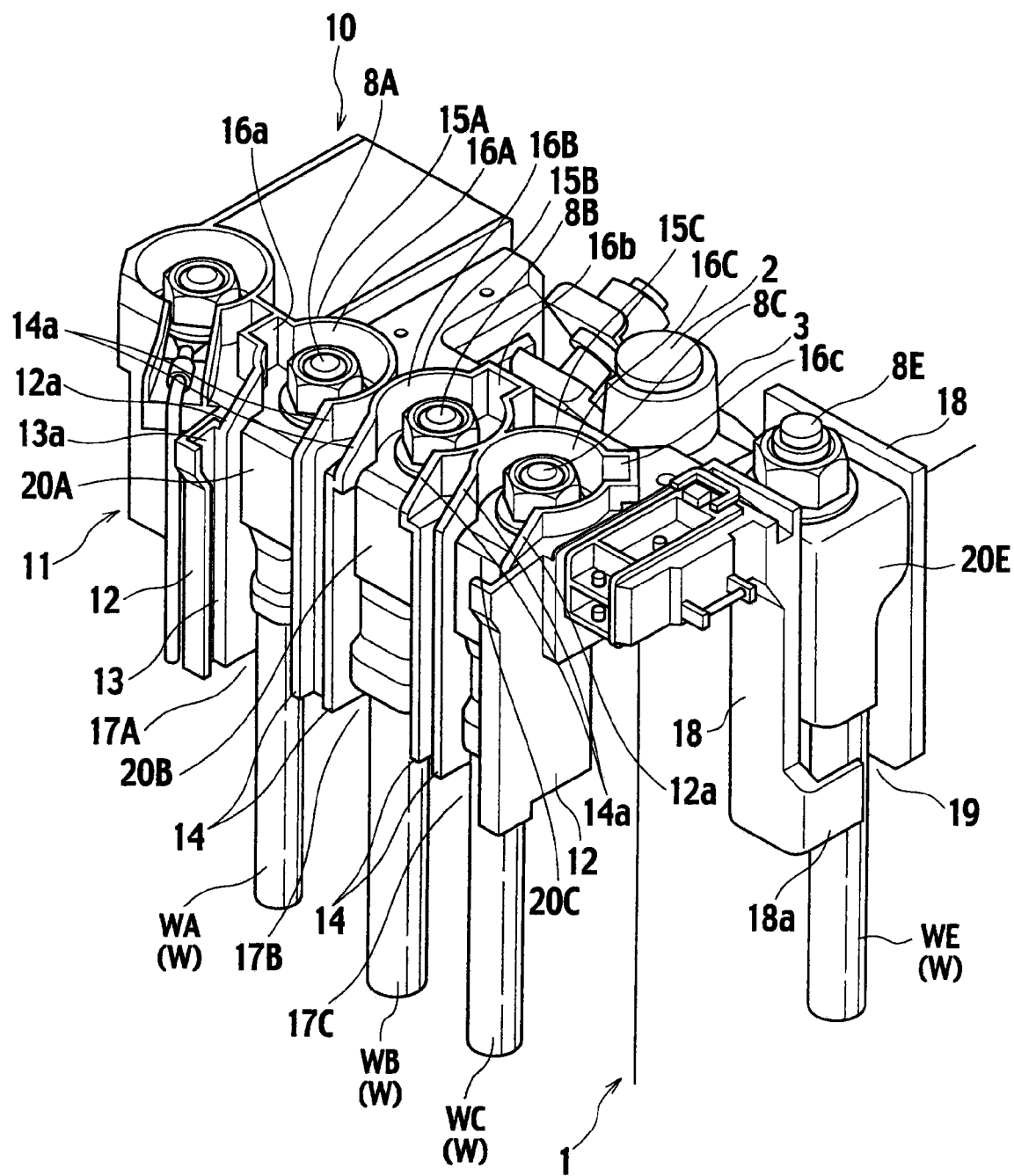
FIG. 2 is a perspective view showing a fusible link unit directly mounted to a battery without a protection cover in an embodiment of the present invention.
Figure 3:
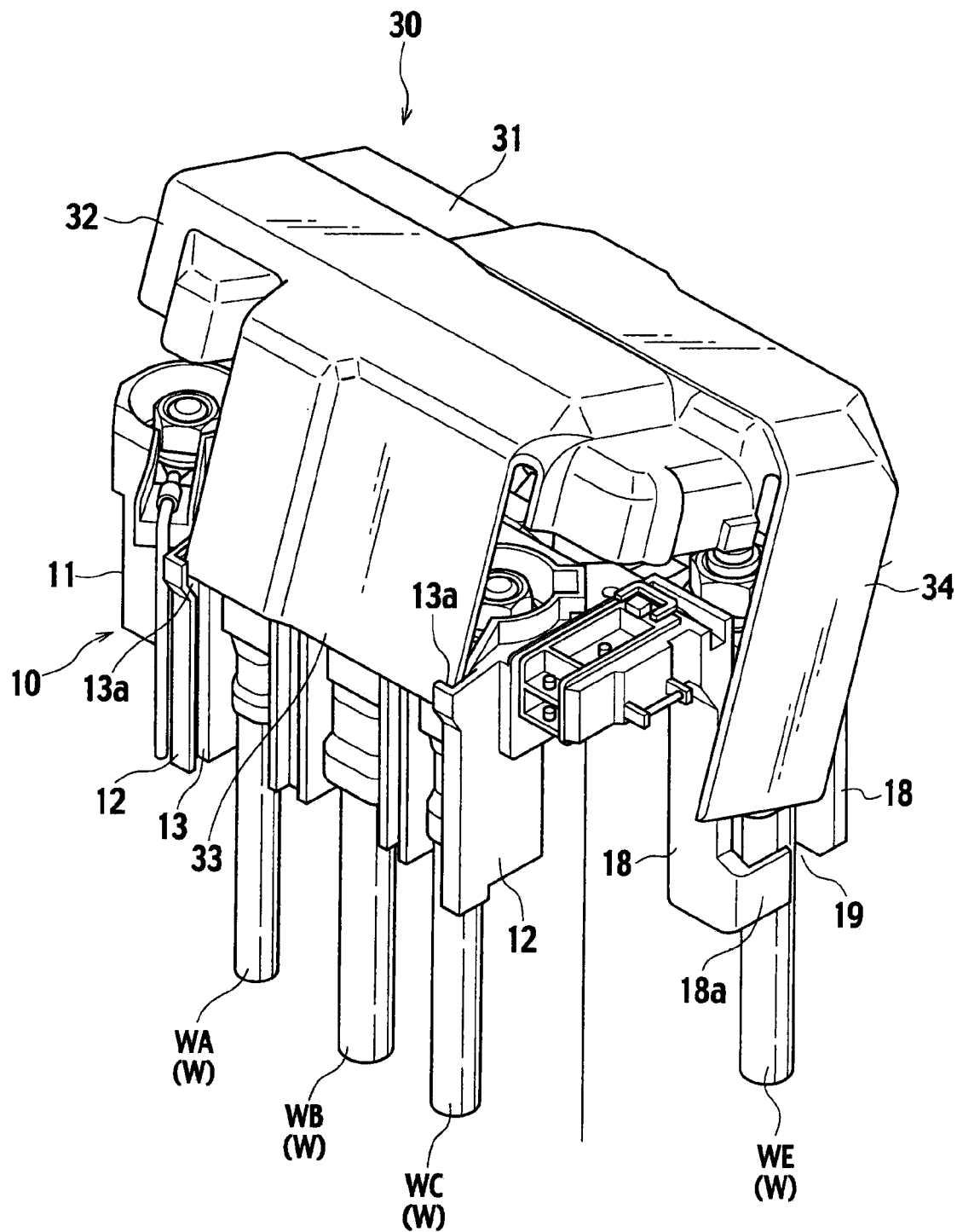
FIG. 3 is a perspective view showing the protection cover being put over the fusable link unit.

Hereinafter, a description is given of an embodiment of the present invention with reference to the drawings. As shown in FIGS. 2 and 3, a structure according to the embodiment includes a fusible link unit 10 and a protection cover 30. The fusible link unit 10 includes a first terminal section BE and second terminal sections 8A to 8C, which are provided on an upper surface of the fusible link unit 10. The first terminal section 8E and second terminal sections BA to BC are connected to wire-attached terminals 20A to 20C provided with wires W (WE, WA, WB, and WC) extending downward, respectively. The protection cover 30 is put over the fusible link unit 10 which is directly mounted on the battery 1.

Herein, the first terminal section 8E is an input terminal section connected to the battery post 2 through the battery terminal 3 and serves as a second terminal section connected to a starter wire WE-attached terminal 20E. The other second terminal sections BA to BC are output terminal sections connected to the terminals 20A to 20C attached to the wires WA to WC connected to loads.

Figure 4:
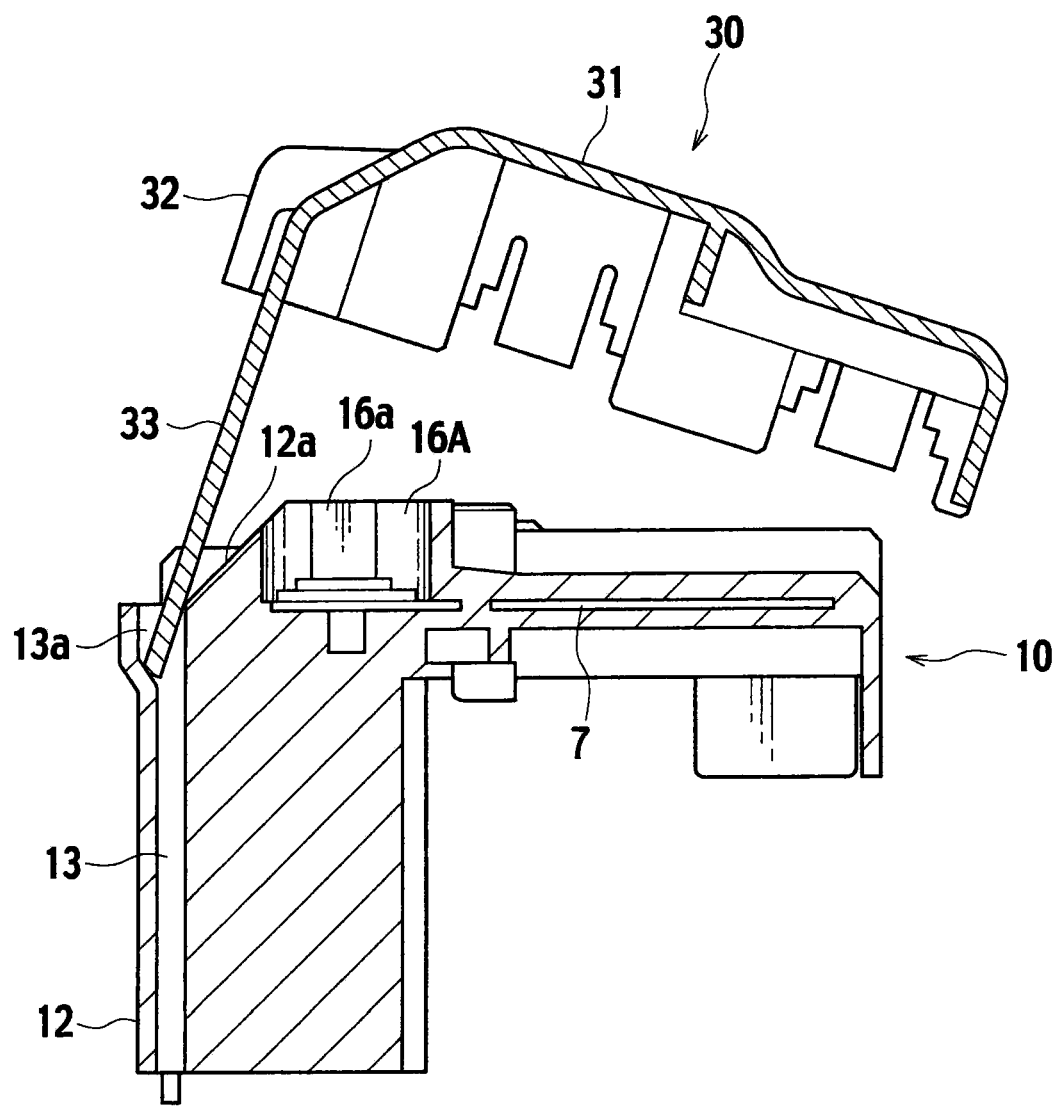
FIG. 4 is a cross-sectional view of the state of FIG. 3 cut at a position of a slide guide recess.
Figure 5:
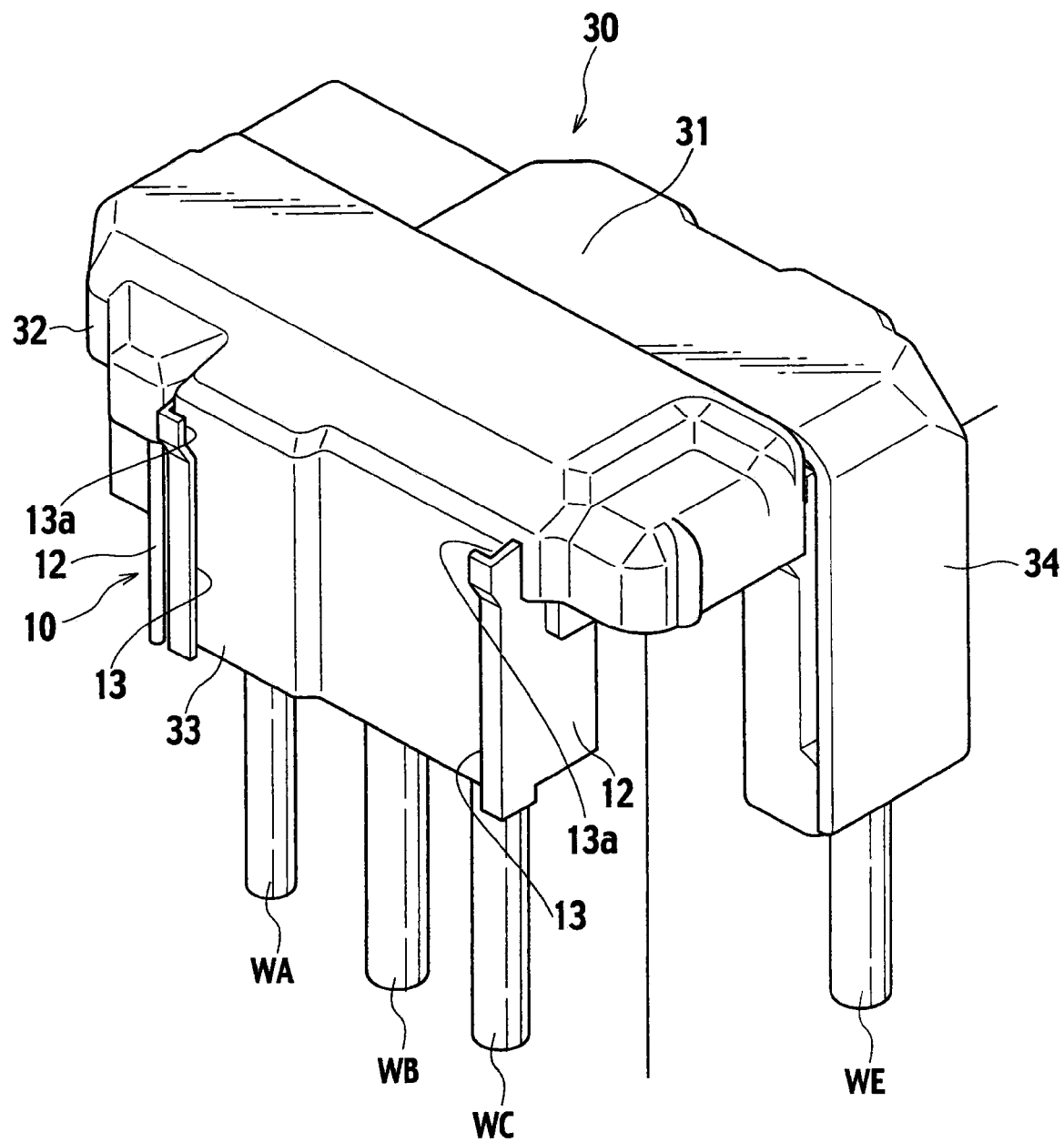
FIG. 5 is a perspective view showing the protection cover completely put over the fusible link unit.

The input and output terminal sections are constituted by a busbar (a part of which is shown in FIG. 4) with input and output terminal pieces (not shown) formed thereon in each of which a bolt stands. The input and output terminal pieces are formed by pressing on the single busbar connected through fuse elements (not shown). The bolts and necessary parts of the busbar 7 are resin-molded with the input and output terminal sections and fuse elements exposed, thus constituting the fusible link unit 10 as a whole.

On the upper surface of a resin housing 11 of the fusible link unit 10, the second terminal sections 8A to 8C, first terminal section 8E, and the like are provided with the heads of the bolt sup. Around the individual second terminal sections BA to BC, cylindrical walls 15A to 15C are provided in a protruding manner. The cylindrical walls 15A to 15C constitute the terminal accommodating recess sections 16A to 16C, into which the wire-attached terminals 20A to 20C are inserted from above, respectively.

The cylindrical walls 15A to 15C are provided with openings in part facing the side of the housing 11. The cylindrical walls 15A to 15C respectively have a recesse 16a to 16c at different circumferential positions each other. The recesses 16a to 16c prevent wrong setting of the wire-attached terminals 20A to 20C and are engaged with protrusions (not shown) provided for peripheries of disk portions of the wire-attached terminals 20A to 20C.

In the side surface of the housing 11 with openings of the cylindrical walls 15A to 15C aligned (below the second terminal sections), a pair of side walls 12, 12 extending in the top-bottom direction are protruded. The pair of side walls 12, 12 are positioned at a distance therebetween corresponding to the outermost positions of the three aligned cylindrical walls 15A to 15C. Between the both side walls 12, 12, partition walls 14 constituting wire accommodation recesses 17A to 17C extending in the top-bottom direction are provided. The pair of side walls 12, 12 and partition walls 14 are provided at the positions corresponding to right and left side edges of the openings of the cylindrical walls 15A to 15C and are formed so as to be continuous to the cylindrical walls 15A to 15C. The wire accommodation recesses 17A to 17C thus communicate with the terminal accommodation recess sections 16A to 16C, respectively.

In the surfaces of the pair of side walls 12, 12 opposed to each other, slide guide grooves 13 are individually provided with linearly extending in the top-bottom direction. In upper part of each slide guide groove 13, an inlet portion 13a is provided. The inlet portion 13a is formed so as to be wider than the slide guide groove 13 in an outward direction from the side surface of the housing 11 to the outside thereof. The inner surface of the inlet portion 13a serves as a guide section described later. The upper edges of the side walls 12 and partition walls 14 connected to the cylindrical walls 15A to 15C are chamfered to be slope portions 12a and 14a which serve as a later-described guide section. As shown in FIG. 4, the positions and slope angles of the upper edges of the inlet portions 13a of the slide guide grooves 13 are set so as to be positioned above the respective extensions of the slopes of the slope portions 12a (14a). Moreover, a step portion inside each inlet portion 13a has a slope for guiding.

Moreover, in a side surface of the housing 11 orthogonal to the side surface where the wire-attached terminals 20A to 20C on the output side are attached, a pair of side walls 18 is provided. The side walls 18 constitute the wire accommodation groove 19 accommodating the starter wire-attached terminal 20E and wire WE. In a lower end of one of the side walls 18, a wire restriction portion 18a is provided to prevent the wire WE accommodated in the wire accommodation groove 19 from being detached. The wire restriction portion 18a includes a protrusion bent into an L shape at the end of one of the side walls 18. At least one of the side walls 18 is flexible and, to accommodate the wire WE in the wire accommodation groove 19, allows the wire WE to be inserted into a gap between the protrusion and the other sidewall 18.

The protection cover 30 includes an upper surface cover 31, a peripheral wall 32, and side surface covers 33 and 34. The upper surface cover 31 covers the upper surface of the fusible link unit 10, the battery post 2, and the battery terminal 3. The peripheral wall 32 is continuously extended downward from the peripheral edge of the upper surface cover 31. The side surface covers 33 and 34 are extended downward from the peripheral edge of the upper surface cover 31. The side surface covers 33 and 34 cover the wire-attached terminals 20A to 20C and 20E connected to the second terminal sections 8A to 8C and first terminal section 8E and also cover upper parts of the wires WA, WB, WC, and WE respectively which are connected to the terminals 20A, 20B, 20C, and 20E and extended downward.

As shown in FIGS. 3 and 4, at putting the protection cover 30 over the fusible link unit 10 from above, the aforementioned slide guide grooves 13 of the fusible link unit 10 restrict the position of the side surface cover 33 and guide the side edges of the side surface cover 33 down. The inner surfaces of the inlet portions 13a of the slide guide grooves 13 and sloping portions 12a and 14a near the same serve as a guide allowing the bottom ends of the side edges of the side cover 33 to be easily inserted into the slide guide groove 13.

Next, a description is given of an operation of the same.

To attach the fusible link unit 10 to the battery 1, as shown in FIG. 2, the first terminal section BE of the fusible link unit 10 is connected to the battery post 2 through the battery terminal 3. At the same time, the starter wire-attached terminal 20E is fastened together with the first terminal section BE, and the starter wire WE is inserted into the wire accommodation groove 19. The wire-attached terminals 20A to 20C on the output side are connected to the second terminal sections BA to BC for output, respectively, and the wires WA to WC extending downward from the terminals 20A to 20C are inserted into the wire accommodation grooves 17A to 17C, respectively.

After the fusible link unit 10 is directly mounted on the battery 1 in such a manner, as shown in FIGS. 3 and 4, the protection cover 30 is put over from above. When the protection cover 30 is simply put over the fusible link unit 10, the both side edges of the side surface cover 33 of the protection cover 30 are inserted into the slide guide grooves 13 to be guided. The protection cover 30 can be therefore reliably positioned and easily attached to a predetermined position, thus improving the workability in attaching the protection cover 30.

Especially, the fusible link unit 10 is provided with the inlet portions 13a and slope portions 12a and 14a serving as the guide. The operation thereof allows the bottom ends of the side edges of the side cover unit 33 to be easily inserted into the slide guide groove 13. Even when the part to be covered with the protection cover 30 has some deviations or even when the protection cover 30 is a little tilted, therefore, the bottom ends of the side edges of the side surface cover 33 can be inserted into the slide guide grooves 13, and the protection cover 30 can be easily attached to the fusible link unit 10.

Actually, an operator puts the protection cover 30 over the fusible link unit 10 already fixed to the battery 1 and often puts the same in an improper position. However, if the operator puts the protection cover 30 over the fusible link unit 10 by guess, the side surface cover 33 can be automatically guided to the slide guide grooves 13 by the operation of the guide. Accordingly, the protection cover 30 can be attached very easily, thus improving the workability.

In a state where the protection cover 30 is attached, the upper surface cover 31 covers the first and second terminal sections 8E and BA to 8C in the upper surface of the fusible link unit 10 and the entire part connected to the battery post 2, and the side surface covers 33 and 34 cover the wire-attached terminals 20A to 20C and 20E exposed in the side surface of the fusible link unit 10 and the upper parts of the wires WA to WC and WE. Accordingly, the terminals 20A to 20C and 20E and the exposed parts of the conductors of the wires WA to WC and WE can be entirely covered with the protection cover 30 in a safe way.

Moreover, the side surface covers 33 and 34 are integrally provided with the protection cover 30. Accordingly, by just putting the protection cover 30 over the fusible link unit 10, the necessary part of the side surface of the fusible link unit 10 can be covered. Accordingly, in the case where space in the side of the battery 1 is so narrow that the operator's hand cannot reach the side of the battery 1 where the wires are attached, the side covers 33 and 34 can be attached and detached.

Generally, the resin material constituting the housing 11 of the fusible link unit 10 is often added with talc or glass filler in view of the heat resistance when the fuse elements are fused. In such a case, the housing tends to be not resistant to deflection. However, this embodiment employs such a simple structure that just the slide guide grooves 13 are formed in the fusible link unit 1 and does not include part that receives excessive force like a hinge. Accordingly, there is no need to worry about lack of strength, and the housing 11 of the fusible link unit 10 can be made of normal cheep resin instead of heat resistant resin with high strength.

Moreover, in the side walls 18 of the wire accommodation groove 19 for the thick starter wire WE, the wire restriction portion 18a is provided. Therefore, the wire WE once accommodated in the wire accommodation groove 19 can be held so as not to be detached. For example, in the case of the aforementioned starter wire WE, while receiving large bending force caused by deflection, vibration, and the like due to a vehicle layout, the starter wire WE tends to be detached even if accommodated. In this case, a large load is applied on a wire crimping portion. However, according to the embodiment, it is possible to prevent the wire WE from being detached from the wire accommodation groove 19 by the operation of the wire restriction portion 18a to reduce load on the wire crimping portion, thus increasing the reliability.

The structure of the wire restriction portion 18a can provide the same effect even when the wire restriction portion 18a is provided for each wire accommodation groove (17A, 17B, and 17C) other than the wire accommodation groove 19.

What is claimed is:

1. A protection cover attachment structure of a battery-mounted fusible link unit, comprising:
   a resin housing having:
      an upper surface on which a terminal section is provided, the terminal section being connected to a battery post through a battery terminal and being connected to wire-attached terminals with wires extending downward therefrom;
      a side surface extending downward from the upper surface thereof, the side surface having at least two walls protruding therefrom to define a wire accommodation groove extending downward from the terminal section for accommodating the wires extending downward from the wire-attached terminals, wherein two walls of the at least two walls having slide guide grooves extending downward with openings facing inward toward each other; and
   a protection cover having:
      an upper surface cover covering the upper surface of the resin housing and the battery post and battery terminal; and
      a side surface cover extending downward from a peripheral edge of the upper surface cover, the side surface cover being provided on the side surface of the resin housing to cover the wire-attached terminals, and an upper part of the wires in the wire accommodation groove;
   wherein, the slide guide grooves receive a side edge of the side surface cover to guide the side surface cover downward and to restrict a transverse movement thereof.

2. The protection cover attachment structure according to claim 1, wherein
   the slide guide grooves include a guide section in an upper end thereof, the guide section facilitating insertion of a lower end of the side edge of the side surface cover into the slide guide grooves.

3. The protection cover attachment structure according to claim 2, wherein
   the guide section is wider than the other portion of the slide guide grooves.

4. The protection cover attachment structure according to claim 2, wherein
   the at least two walls include:
      a slope portion provided in each of upper portions thereof;
   wherein an upper edge of the guide section is positioned above an extension of the slope of the slope portion.

5. The protection cover attachment structure according to claim 4, wherein at least one of the at least two walls includes a wire restriction portion preventing a wire accommodated in the wire accommodation groove from being detached.

6. The protection cover attachment structure according to claim 5, wherein
the wire restriction portion includes a protrusion formed by bending an end of the one of the walls into an L-shape.

\* \* \* \* \*